United States Patent
Glickshtein

(10) Patent No.: US 11,924,352 B2
(45) Date of Patent: Mar. 5, 2024

(54) SYSTEMS, APPARATUS AND METHODS FOR LOCAL STATE STORAGE OF DISTRIBUTED LEDGER DATA WITHOUT CLONING

(71) Applicant: EYGS LLP, London (GB)

(72) Inventor: Aminadav Glickshtein, Jerusalem (IL)

(73) Assignee: EYGS LLP, London (GB)

( * ) Notice: Subject to any disclaimer, the term of this patent is extended or adjusted under 35 U.S.C. 154(b) by 0 days.

(21) Appl. No.: 18/170,844

(22) Filed: Feb. 17, 2023

(65) Prior Publication Data
US 2023/0216689 A1 Jul. 6, 2023

Related U.S. Application Data

(62) Division of application No. 16/848,284, filed on Apr. 14, 2020, now Pat. No. 11,677,563.
(Continued)

(51) Int. Cl.
*H04L 9/32* (2006.01)
*G06F 16/23* (2019.01)
(Continued)

(52) U.S. Cl.
CPC ........ *H04L 9/3239* (2013.01); *G06F 16/2365* (2019.01); *G06F 16/2379* (2019.01);
(Continued)

(58) Field of Classification Search
CPC ............. G06F 16/2365; G06F 16/2379; G06F 11/3664; G06F 11/3672; G06F 11/3696;
(Continued)

(56) References Cited

U.S. PATENT DOCUMENTS 9,397,985 B1  7/2016 Seger, II et al.
9,608,829 B2  3/2017 Spanos et al.
(Continued)

FOREIGN PATENT DOCUMENTS

CN  107274184 A  10/2017
CN  106598824 B  * 11/2018 .......... G06F 11/3452
(Continued)

OTHER PUBLICATIONS

Andreev, O., "Hidden in Plain Sight: Transacting Privately on a Blockchain. Introducing Confidential Assets in the Chain Protocol," [Online], Retrieved from the Internet: URL: https://blog.chain.com/hidden-in-plain-sight-transacting-privately-on-a-blockchain-835ab7... ], Retrieved on Aug. 27, 2018, 11 pages.
(Continued)

*Primary Examiner* — Dennis Truong
(74) *Attorney, Agent, or Firm* — COOLEY LLP

(57) ABSTRACT

Distributed ledger-based networks (DLNs) employ self-executing codes, also known as smart contracts, to manage interactions occurring on the networks, which may result in the generation of a massive amount of DLN state data representing the interactions and participants thereof. The instant disclosure discloses systems, apparatus and methods that allow interactions to occur on the DLNs without modification to stored data, thereby improving the storage capabilities of the networks.

17 Claims, 4 Drawing Sheets

Related U.S. Application Data

(60) Provisional application No. 62/833,913, filed on Apr. 15, 2019, provisional application No. 62/834,057, filed on Apr. 15, 2019.

(51) Int. Cl.
    *G06Q 20/06*     (2012.01)
    *H04L 9/00*     (2022.01)
    *H04L 69/22*     (2022.01)

(52) U.S. Cl.
    CPC .............. *G06Q 20/06* (2013.01); *H04L 69/22* (2013.01); *G06Q 2220/00* (2013.01); *H04L 9/50* (2022.05)

(58) Field of Classification Search
    CPC .... G06F 11/3495; H04L 9/3239; H04L 69/22; H04L 2209/38; H04L 9/3247; H04L 9/50; G06Q 20/06; G06Q 2220/00; G06Q 20/065; G06Q 20/401
    See application file for complete search history.

(56) References Cited

U.S. PATENT DOCUMENTS

| | | | |
|---|---|---|---|
| 9,785,369 | B1 | 10/2017 | Ateniese et al. |
| 9,794,074 | B2 | 10/2017 | Toll et al. |
| 9,870,508 | B1 | 1/2018 | Hodgson et al. |
| 9,881,176 | B2 | 1/2018 | Goldfarb et al. |
| 9,906,513 | B2 | 2/2018 | Wuehler |
| 9,942,231 | B1 | 4/2018 | Laucius et al. |
| 9,948,467 | B2 | 4/2018 | King |
| 9,959,065 | B2 | 5/2018 | Ateniese et al. |
| 10,026,118 | B2 | 7/2018 | Castinado et al. |
| 10,298,395 | B1 | 5/2019 | Schiatti et al. |
| 10,721,069 | B2 | 7/2020 | Konda et al. |
| 10,825,295 | B2 | 11/2020 | Simons |
| 10,833,861 | B2 | 11/2020 | Chari et al. |
| 10,951,409 | B2 | 3/2021 | Konda et al. |
| 11,146,399 | B2 | 10/2021 | Westland et al. |
| 11,188,977 | B2 | 11/2021 | Youb et al. |
| 11,194,837 | B2* | 12/2021 | Vo .................... G06F 16/2365 |
| 11,502,838 | B2 | 11/2022 | Connor |
| 11,582,043 | B2 | 2/2023 | Glickshtein |
| 11,677,563 | B2 | 6/2023 | Glickshtein |
| 11,683,175 | B2 | 6/2023 | Connor |
| 11,683,176 | B2 | 6/2023 | Connor |
| 2014/0279384 | A1* | 9/2014 | Loevenich ............. G06Q 40/03 705/38 |
| 2016/0260169 | A1 | 9/2016 | Arnold et al. |
| 2016/0358165 | A1 | 12/2016 | Maxwell |
| 2017/0091750 | A1 | 3/2017 | Maim |
| 2017/0161829 | A1 | 6/2017 | Mazier |
| 2017/0163733 | A1 | 6/2017 | Grefen et al. |
| 2017/0243212 | A1 | 8/2017 | Castinado et al. |
| 2017/0278100 | A1 | 9/2017 | Kraemer et al. |
| 2017/0293503 | A1 | 10/2017 | Curtis |
| 2017/0346639 | A1 | 11/2017 | Muftic |
| 2018/0048461 | A1 | 2/2018 | Jutla et al. |
| 2018/0077122 | A1 | 3/2018 | Hoss et al. |
| 2018/0101701 | A1 | 4/2018 | Barinov et al. |
| 2018/0137465 | A1* | 5/2018 | Batra ................... H04L 67/104 |
| 2018/0139043 | A1 | 5/2018 | Jayachandran et al. |
| 2018/0158036 | A1 | 6/2018 | Zhou et al. |
| 2018/0165131 | A1 | 6/2018 | O'Hare et al. |
| 2018/0189753 | A1 | 7/2018 | Konda et al. |
| 2018/0191503 | A1 | 7/2018 | Alwar et al. |
| 2018/0218176 | A1 | 8/2018 | Voorhees et al. |
| 2018/0219669 | A1* | 8/2018 | Chen ....................... H04L 9/002 |
| 2018/0285217 | A1 | 10/2018 | Smith et al. |
| 2018/0294967 | A1* | 10/2018 | Roberts ................. H04L 9/3255 |
| 2018/0343114 | A1 | 11/2018 | Ben-Ari |
| 2019/0012660 | A1 | 1/2019 | Masters |
| 2019/0012662 | A1 | 1/2019 | Krellenstein et al. |
| 2019/0019180 | A1* | 1/2019 | Coburn ................. H04L 9/0643 |
| 2019/0034923 | A1 | 1/2019 | Greco et al. |
| 2019/0102756 | A1 | 4/2019 | Zhou et al. |
| 2019/0138621 | A1 | 5/2019 | Tobias et al. |
| 2019/0158275 | A1 | 5/2019 | Beck |
| 2019/0164153 | A1 | 5/2019 | Agrawal et al. |
| 2019/0165943 | A1 | 5/2019 | Chari et al. |
| 2019/0173854 | A1 | 6/2019 | Beck |
| 2019/0190701 | A1 | 6/2019 | Mitra et al. |
| 2019/0236559 | A1* | 8/2019 | Padmanabhan ........ G06Q 20/02 |
| 2019/0236594 | A1* | 8/2019 | Ehrlich-Quinn ..... G06Q 20/401 |
| 2019/0238525 | A1 | 8/2019 | Padmanabhan et al. |
| 2019/0244290 | A1 | 8/2019 | Massacci et al. |
| 2019/0286102 | A1 | 9/2019 | Carbone et al. |
| 2019/0299105 | A1* | 10/2019 | Knight .................. H04L 9/3247 |
| 2019/0303541 | A1* | 10/2019 | Reddy ..................... G06F 21/64 |
| 2019/0370792 | A1 | 12/2019 | Lam |
| 2020/0013118 | A1 | 1/2020 | Treat et al. |
| 2020/0059361 | A1 | 2/2020 | Konda et al. |
| 2020/0059362 | A1 | 2/2020 | Brody et al. |
| 2020/0059364 | A1 | 2/2020 | Konda et al. |
| 2020/0067907 | A1 | 2/2020 | Avetisov et al. |
| 2020/0074518 | A1 | 3/2020 | Kumaraswamy et al. |
| 2020/0076615 | A1 | 3/2020 | Redpath et al. |
| 2020/0082411 | A1 | 3/2020 | Lacona |
| 2020/0127833 | A1 | 4/2020 | Konda et al. |
| 2020/0127834 | A1 | 4/2020 | Westland et al. |
| 2020/0159847 | A1 | 5/2020 | Smith et al. |
| 2020/0160319 | A1 | 5/2020 | Smith et al. |
| 2020/0175623 | A1 | 6/2020 | Howie |
| 2020/0193425 | A1 | 6/2020 | Ferenczi et al. |
| 2020/0193429 | A1 | 6/2020 | Babar et al. |
| 2020/0210519 | A1* | 7/2020 | Wang .................... H04L 9/3247 |
| 2020/0234386 | A1* | 7/2020 | Blackman ................ H04L 9/30 |
| 2020/0274712 | A1 | 8/2020 | Gray et al. |
| 2020/0275273 | A1 | 8/2020 | Smith et al. |
| 2020/0322154 | A1 | 10/2020 | Konda et al. |
| 2020/0327100 | A1* | 10/2020 | Androulaki .......... G06Q 20/223 |
| 2020/0327112 | A1 | 10/2020 | Glickshtein |
| 2020/0328890 | A1 | 10/2020 | Connor |
| 2020/0328894 | A1 | 10/2020 | Baker |
| 2020/0328899 | A1 | 10/2020 | Glickshtein |
| 2020/0410460 | A1* | 12/2020 | Nissan ..................... G06F 18/22 |
| 2021/0019849 | A1* | 1/2021 | Qian ........................ G06F 9/547 |
| 2023/0046268 | A1 | 2/2023 | Connor |
| 2023/0047830 | A1 | 2/2023 | Connor |
| 2023/0071564 | A1 | 3/2023 | Connor |
| 2023/0198774 | A1 | 6/2023 | Glickshtein |

FOREIGN PATENT DOCUMENTS

| | | |
|---|---|---|
| CN | 109359948 A | 2/2019 |
| WO | WO-2017187395 A1 | 11/2017 |
| WO | WO-2018007828 A2 | 1/2018 |
| WO | WO-2018028777 A1 | 2/2018 |
| WO | WO-2018144302 A1 | 8/2018 |
| WO | WO-2019180702 A1 * | 9/2019 ............. G06F 21/64 |

OTHER PUBLICATIONS

Ben-Sasson, E. et al., "Scalable, transparent, and post-quantum secure computational integrity," Cryptology ePrint Archive, Report 2018/046 (2018), 83 pages.

Bunz, B. et al., "Zether: Towards privacy in a smart contract world," IACR, International Association for Cryptologic Research, vol. 20190226:031535, Feb. 20, 2019, Retrieved from the Internet: URL: http://eprint.iacr.org/2019/191.pdf, Retrieved on Feb. 20, 2019, 49 pages.

Dinh, T. T. A. et al., "Blockbench: A framework for analyzing private blockchains," [Online], Retrieved from the Internet: URL: https://arxiv.org/abs/1703.04057arXiv:1703.04057v1, Mar. 12, 2017, 16 pages.

Final Rejection for U.S. Appl. No. 16/383,845, dated Sep. 30, 2022, 13 pages.

Final Rejection Office Action for U.S. Appl. No. 16/542,701 dated Oct. 6, 2022, 28 pages.

(56) References Cited

OTHER PUBLICATIONS

Groth, J. et al., "Snarky signatures: Minimal signatures of knowledge from simulation-extractable SNARKs," In: Katz, J., Shacham, H. (eds.) CRYPTO 2017. LNCS, vol. 10402, pp. 581-612.
International Search Report and Written Opinion for International Application No. PCT/EP2020/060610, dated Jul. 27, 2020, 17 pages.
International Search Report and Written Opinion for International Application No. PCT/EP2020/060623, dated Aug. 7, 2020, 16 pages.
International Search Report and Written Opinion for International Application No. PCT/EP2020/060626, dated Sep. 3, 2020, 12 pages.
International Search Report and Written Opinion for International Application No. PCT/EP2020/060629, dated Jun. 25, 2020, 9 pages.
International Search Report and Written Opinion for International Application No. PCT/US2019/046532, dated Dec. 2, 2019, 10 pages.
International Search Report and Written Opinion for International Application No. PCT/US2019/046808, dated Dec. 2, 2019, 9 pages.
International Search Report and Written Opinion for International Application No. PCT/US2019/057246, dated Feb. 4, 2020, 8 pages.
International Search Report and Written Opinion for International Application No. PCT/US2019/057262, dated Jan. 24, 2020, 9 pages.
Invitation to Pay Additional Fees and Partial International Search Report for International Application No. PCT/EP2020/060623, dated Jun. 17, 2020, 12 pages.
Jiang, Y. et al., "A privacy-preserving e-commerce system based on the blockchain technology," 2019 IEEE International Workshop on Blockchain Oriented Software Engineering (IWBOSE 2019), Hangzhou, China, Feb. 2019, pp. 50-55.
Khalil, R. et al., "NOCUST—A securely scalable commit-chain," Feb. 15, 2019, Retrieved from the Internet: URL:https://eprint.iacr.org/eprint-bin/getfile.plentry=2018/642&version=20190215:182502&file=642.pdf, Retrieved on Mar. 10, 2020, 27 pages.
Kosba, A. et al., "Hawk: The Blockchain Model of Cryptography and Privacy-Preserving Smart Contracts," 2016 IEEE Symposium on Security and Privacy, May 2016, pp. 839-858.
Lee, C. H. et al., "Implementation of IoT system using blockchain with authentication and data protection," 2018 International Conference on Information Networking (ICOIN), IEEE, Jan. 10, 2018, pp. 936-940.
Magazzeni, D. et al., "Validation and verification of smart contracts: A research agenda," Computer, vol. 50, No. 9, Sep. 2017, pp. 50-57.
Menezes, A. et al., "Key Management Techniques," Chapter 13 in Handbook of Applied Cryptography, CRC Press. 1996, pp. 543-590.
Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.
Office Action for U.S. Appl. No. 16/283,452, dated Jul. 10, 2019, 31 pages.
Office Action for U.S. Appl. No. 16/283,452, dated Nov. 6, 2019, 34 pages.
Office Action for U.S. Appl. No. 16/383,845, dated Apr. 25, 2022, 13 pages.
Office Action for U.S. Appl. No. 16/383,845, dated Sep. 29, 2021, 11 pages.
Office Action for U.S. Appl. No. 16/534,858, dated Jun. 23, 2021, 11 pages.
Office Action for U.S. Appl. No. 16/542,701, dated Jun. 9, 2022, 28 pages.
Office Action for U.S. Appl. No. 16/659,335, dated Apr. 23, 2020, 12 pages.
Office Action for U.S. Appl. No. 16/659,335, dated Aug. 13, 2020, 15 pages.
Office Action for U.S. Appl. No. 16/848,284, dated Mar. 10, 2022, 11 pages.
Orcutt, M., "Perfect Online Privacy | A tool developed for blockchains makes it possible to carry out a digital transaction without revealing any more Information than absolutely necessary," MIT Technology Review, Mar. 2018-Apr. 2018, vol. 121. No. 2, p. 45.
Parno, B. et al., "Pinocchio: Nearly practical verifiable computation," S&P (2013), 16 pages.
Trufflesuite | Ganache, 6 pages, retrieved online on Sep. 22, 2022, <https://github.com/trufflesuite/ganache/commit/332be605c13.>.
Wu, H., "DIZK: Distributed zero-knowledge proof systems," In USENIX Security (2018), 35 pages.
Xu, L. et al., "DL-BAC: Distributed Ledger Based Access Control for Web Applications," 2017 International World Wide Web Conference Committee (IW3C2), WWW17 Companion, Apr. 3-7, 2017, Perth, Australia; pp. 1445-1450.
Zhang, Y. et al., "Z-Channel: Scalable and efficient scheme in zerocash," 2017, [Online], Retrieved from the Internet: https://eprint.iacr.org/2017/684, pp. 1-39.
Clifton, M., "Understanding Merkle Trees—Why use them, who uses them, and how to use them," [Online], www.codeproject.com, Mar. 13, 2017, 21 pages.
Examiners Answer to Appeal Brief in U.S. Appl. No. 16/542,701, dated Jun. 14, 2023, 27 pages.
Non Final Office Action for U.S. Appl. No. 18/109,017 dated May 2, 2023, 5 pages.
Office Action for U.S. Appl. No. 16/383,845, dated Jun. 2, 2023, 14 pages.

\* cited by examiner

SYSTEMS, APPARATUS AND METHODS FOR LOCAL STATE STORAGE OF DISTRIBUTED LEDGER DATA WITHOUT CLONING

CROSS-REFERENCE TO RELATED PATENT APPLICATION

This application is a divisional of U.S. patent application Ser. No. 16/848,284, filed Apr. 14, 2020, now U.S. Pat. No. 11,677,563, which claims priority to and the benefit of U.S. Provisional Application No. 62/834,057, filed Apr. 15, 2019, entitled "Systems, Apparatus and Methods for Local State Storage of Distributed Ledger Data Without Cloning," and U.S. Provisional Application No. 62/833,913, filed Apr. 15, 2019, entitled "Systems, Apparatus and Methods for Forking Distributed Ledger Data within a Network and Securely without Using Private Keys," both of which are incorporated herein by reference in their entirety.

FIELD OF DISCLOSURE

Distributed ledger-based networks (DLNs) employ self-executing codes to manage interactions occurring on the networks, which may result in the generation of a massive amount of DLN state data representing the interactions and participants thereof. The instant disclosure discloses systems, apparatus and methods that allow interactions to occur on the DLNs without modification to stored data, or the cloning of the data storage storing the data, thereby improving the storage capabilities of the networks.

BACKGROUND

Data generated as a result of interactions occurring on distributed ledger-based networks (DLNs) are recorded on ledgers that are stored on storage systems associated with the computing nodes that constitute the DLNs. The data are recorded when there is consensus among at least a significant number of the users of the computing nodes on the validity of the interactions that led to the generation of the data. The so-called forking of a DLN occurs when a client of the DLN obtains a duplicate of all the data generated since the inception of the DLN and starts recording additional data in the ledgers of the forked DLN without the same additional data being recorded in the original DLN.

SUMMARY OF THE DISCLOSURE

Some embodiments of the current disclosure disclose systems, apparatus and methods directed at local state storage of data generated as a result of interactions conducted on a distributed ledger-based networks (DLN) without cloning the distributed ledgers of the DLN. For example, the embodiments disclose a processor-readable non-transitory medium storing processor-issuable instructions that are configured to load, from the DLN and onto a first storage of the computing node, a ledger of the DLN onto which are recorded prior transactions executed on the DLN. Further, the processor-issuable instructions may be configured to generate, at the computing node and in response to the request, a test transaction to audit the self-executing code segment and/or the account, the test transaction configured such that an output of an execution of the test transaction is stored in a second storage at the computing node that is different from the first storage. In some implementations, the request includes a plurality of requests, and the loading the ledger of the DLN occurs fewer times than a number of the plurality of requests.

In addition, the processor-issuable instructions may be configured to submit, via the computing node, the test transaction to the self-executing code segment for execution such that the output of the execution is stored in the second storage at the computing node, and analyze the output of the execution to generate a report identifying a restriction imposed by the self-executing code segment on the account and/or transactions involving the account. In some implementations, the processor-issuable instructions can be configured to analyze the output of the execution without forking the DLN.

In some implementations, no output of the execution can be stored in the first storage. In some implementations, the test transaction is configured to redirect to the second storage a "write" operation that is directed to the first storage. In some implementations, the test transaction may be further configured such that an input during the execution of the test transaction is read from the first storage but not from the second storage if the input is available at the first storage. In some implementations, the test transaction is a first test transaction of a plurality of test transactions, no output of the execution of the first test transaction is stored in a storage reserved for storing an output of an execution of a second test transaction of the plurality of test transactions, and the second test transaction is different than the first test transaction.

Some embodiments of the current disclosure also disclose a method including receiving, at a computing node of a DLN, a request to evaluate a behavior of a self-executing code segment of the DLN and/or an account on the DLN. The method further includes forking the DLN to form a forked DLN that includes a ledger onto which are recorded prior transactions executed on the DLN and generating, at the computing node and in response to the request, a test transaction to evaluate the behavior of the self-executing code segment and/or the account. The method also includes submitting, via the computing node, the test transaction to the self-executing code segment on the forked DLN for execution, the test transaction configured such that no output of the execution of the test transaction is recorded on the ledger. In addition, the method includes analyzing the output of the execution to generate a report evaluating the behavior of the self-executing code segment and/or the account.

In some implementations, the request includes a plurality of requests, and the forking the DLN occurs fewer times than a number of requests in the plurality of requests. Further, the test transaction can be configured such that an output of the execution of the test transaction is stored in a storage of the computing node that does not include the ledger. In some implementations, the test transaction is configured to redirect to a storage of the computing node a "write" operation that is directed to the ledger.

Some embodiments of the current disclosure disclose a method comprising receiving, at a computing node of a distributed ledger-based network (DLN), a request to evaluate a behavior of a self-executing code segment on the DLN and/or an account on the DLN. Further, the method comprises loading, from the DLN and onto a first storage of the computing node, a ledger of the DLN onto which are recorded prior transactions executed on the DLN and generating, at the computing node and in response to the request, a test transaction to audit the self-executing code segment and/or the account, the test transaction configured such that an output of an execution of the test transaction is stored in a second storage at the computing node that is different from the first storage. In addition, the method comprises submitting, via the computing node, the test transaction to the self-executing code segment for execution such that the output of the execution is stored in the second storage at the computing node, and analyzing the output of the execution to generate a report evaluating the behavior of the self-executing code segment and/or the account. In some implementations, analyzing the output of the execution to evaluate the behavior of the self-executing code segment and/or the account occurs without a forking of the DLN.

In some implementations, the request to evaluate the behavior of the self-executing code segment and/or the account includes the request to determine a restriction imposed by the self-executing code segment on the account and/or transactions involving the account. In some implementations, the request includes a plurality of requests, and the loading the ledger of the DLN occurs fewer times than a number of requests in the plurality of requests. In some implementations, no output of the execution is stored in the first storage. In some implementations, the test transaction is further configured to redirect to the second storage a "write" operation that is directed to the first storage. In some implementations, the test transaction is further configured such that an input during the execution of the test transaction is read from the first storage but not from the second storage if the input is available at the first storage. In some implementations, the test transaction is a first test transaction of a plurality of test transactions, no output of the execution of the first test transaction is stored in a storage reserved for storing an output of an execution of a second test transaction of the plurality of test transactions, and the second test transaction is different than the first test transaction.

DETAILED DESCRIPTION

Figure 1:
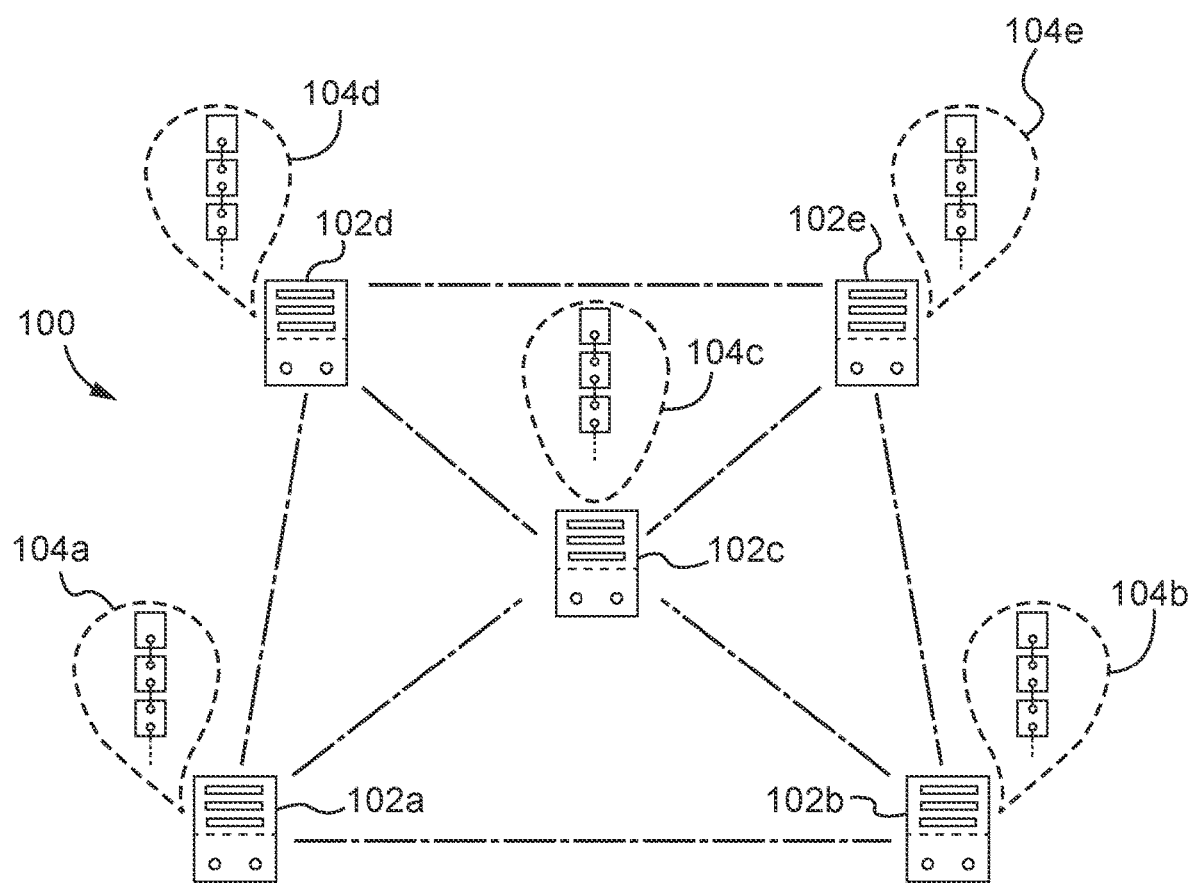
FIG. 1 shows a distributed ledger-based network (DLN) configured for use in conducting transaction between two parties that are participants of the network, according to some embodiments.

In some embodiments, parties participating in a transaction may elect to use a public distributed ledger-based network (DLN) to document the details of the transaction and manage its operations. DLNs can provide decentralized platforms that are transparent to at least all the participants of the networks, if not to the public at large, and as such, can be viewed as consensus-based platforms that facilitate trust between transaction participants without the need for a central authority to administer the network. For example, parties participating in a transaction for a sale (e.g., a private sale) of a digital music file can use a self-executing code or program (e.g., a smart contract) on the DLN to manage the sale of the music file. The self-executing code or smart contract can regulate the exchange of the music file and the correct payment (e.g., crypto-currency) for the file between the parties without involvement from a third party. In some embodiments, the DLNs can also be used to manage transactions involving physical (e.g., non-digital) assets. In some implementations, this can be accomplished by using tokens to represent the assets, and a sale of an asset can be represented by the transfer of the token representing the asset from one party (e.g., the seller) to a second party (e.g., the buyer).

In some embodiments, a DLN can be and/or support a blockchain or blockchain network. In some embodiments, the terms "distributed ledger-based network" and "blockchain network" herein may be used interchangeably. Similarly, in some embodiments, the terms "self-executing code" or "self-executing code segment" and "smart contract" may be used interchangeably. Further, in some embodiments, the term "transaction" may be used to refer, without limitations, to off-chain transactions (e.g., transactions involving the sale of physical or digital assets between parties) and/or on-chain representation of these off-chain transactions (e.g., the transaction of tokens that represent the assets on the blockchain network). Whether the term refers to the former or the latter case should be clear from context. In some embodiments, the term "transaction" may also be used to refer to transactions that occur on the DLN (e.g., transfer of tokens such as but not limited to cryptocurrency between accounts on the DLN). In some embodiments, the terms "off-chain" or "off-the DLN" are to be understood to refer to states or actions that are not occurring "on the blockchain network" or "on the DLN." For example, a statement such as "the data is stored off-the DLN" is to be understood to refer to the state of "the data not being stored on the storage system(s) of, or not being controlled by, the DLN (and is instead stored at or controlled by systems elsewhere, i.e., on a storage system that is not on the DLN)."

In some embodiments, as noted above, smart contracts may be used to manage transactions or interactions on DLNs between multiple DLN participants without the need for a central authority to oversee the transactions. For example, a smart contract may receive a request from a first transaction participant ("sender") to transfer some tokens from a DLN account of the first participant to a DLN account of a second participant ("recipient"). Upon receiving the request, in some implementations, the smart contract may initiate the transfer process, i.e. , the process of adjusting the token balances of the DLN accounts of the sender and the recipient as specified in the transfer request and according to any rules that may be applicable to the transaction, the DLN accounts of the sender and/or recipient, etc. For example, the DLN account of the sender may be subject to a blackout period during which no tokens may be transferred out of the account. In such cases, the smart contract may reject the transfer request or wait until the blackout period is over before proceeding with transferring the tokens. As another example, a rule may include a list of accounts to which tokens from the DLN accounts of the sender can or cannot be transferred, resulting in the smart contract accepting or rejecting the transfer request, respectively.

Accordingly, in some embodiments, the use of smart contracts to manage transactions on DLNs may effectively limit the account rights of DLN account owners. In some embodiments, the term "account owner" may refer to a participant of the DLN that owns or has access to the private key of an account on the DLN (e.g., such an account owner may be able to sign transactions that involve the account with the private key of the account). In some implementations, having ownership of, or access to, a private key of an account on the DLN, however, may not indicate that the account owner also has full rights as they relate to the account. For example, as discussed above, there may be restrictions on actions that an account owner can take with respect to his/her DLN account due to smart contract rules that may apply to the actions and/or the account. For instance, the account owner may be blocked from transferring tokens from her/his account via a smart contract even if the tokens exist in the account and she/he has authorized the transaction (e.g., the transfer of the tokens) with a valid private key. In such implementations, an entity (e.g., auditor) that is tasked with reviewing transactions and accounts involved therewith may wish to review or analyze not only information related to the transactions and the related accounts (e.g., information related to the tokens in the accounts and/or transferred between accounts, the transaction participants, etc.), but also the behavior of the smart contract as it relates to the transactions and the related accounts (e.g., any rules that may apply to the transactions and related accounts).

For example, a participant of the DLN (e.g., company, individual, etc.) may engage an auditor to audit or review the participant's transactions and accounts involved therewith, and the auditor may wish to determine, for instance, the extent of the tokens that exist in the accounts. Further, in some implementations, the auditor may also wish to determine the extent of the rights the participant may have over the tokens in the accounts (besides, for instance, the participant's ownership of, or access to, the private keys of the accounts). That is, the auditor may wish to determine any limitations that may be placed on the tokens contained within the accounts (for example, due to smart contract rules). In such embodiments, to audit or review the accounts, the auditor may initially analyze the functionalities of the smart contract of the DLN. For example, to audit the existence of the tokens in the accounts, the auditor may wish to establish that the smart contract, when activated by the auditor, can accurately determine or call the balance or immediate availability of tokens contained in the accounts. As another example, the auditor may wish to identify any smart contract rules that apply to the tokens to audit any restrictions that may be attached to the accounts (and tokens contained therein).

In some embodiments, an auditor may employ one or more techniques to analyze the functionalities of the smart contract of the DLN to establish that the smart contract, when activated by the auditor, can accurately determine or call the balance or immediate availability of tokens in accounts and/or to determine the presence of any smart contract rules that may apply to tokens in the accounts. For example, the auditor may request the purported account owner ("auditee") to transfer the tokens to a predetermined account as a demonstration of the owner's ability to transfer the tokens—that is, as a demonstration that the tokens exist in the account, the owner has the private key to the account, there are no smart contract rules limiting or restricting the owner's rights over the tokens, and/or etc. Such a technique, however, may be cumbersome and costly (e.g., in the form of transaction fees) for the auditee, as well as being unscalable for the auditor. In some embodiments, the auditor may fork the DLN (i.e., obtain a full copy of the initial DLN, including stored smart contract data related to all transactions recorded on the distributed ledgers of the initial DLN since the inception of the initial DLN) and transfer the tokens in the auditee's account in the forked DLN (i.e., without affecting the initial DLN) to another account as the above-noted demonstration. To transfer the tokens in the account of the forked DLN, however, in some cases, the auditor may have to have access to the private key of the auditee's account, which may not be desirable for both the auditor and the auditee (e.g., due to security and liability reasons). In some embodiments, the auditor may be capable of transferring tokens from an account of a forked DLN without the use of the private key of the account. Systems, Apparatus and Methods for interacting with a DLN without the use of a private key is discussed in Applicant's U.S. Provisional Application No. 62/833,913, filed Apr. 15, 2019, and co-pending U.S. Patent Application (a non-provisional patent application claiming priority to U.S. Provisional Application No. 62/833,913, the contents of which are incorporated herein by reference in their entireties. Further, forking a DLN for audit purposes may not be scalable, as forking the DLN for each account that is being audited would involve a massive amount of resources (e.g., data storage, bandwidth, etc.). In some embodiments, as discussed below in detail, the use of a smart contract state data storage module that stores (e.g., locally) modifications to smart contract data may allow the auditor to analyze the functionalities of the smart contract of the DLN as described above without having to necessarily fork the initial DLN.

In some embodiments, the term "audit" can refer to but is not limited to a review of actions taken on a DLN, a review of participants of the DLN, a review of accounts on the DLN, a review of smart contract on the DLN, a review of the DLN itself (e.g., computing nodes that constitute the DLN) and/or the like. For example, the actions may include transactions undertaken or represented on the DLN, such as but not limited to transactions between participants of the DLN. For instance, an "audit" of the transactions may include a review of the transaction data (e.g., for accuracy, completeness, and/or etc.). An audit or review of the participants may include, for example, a review of the participants' access to, ownership of, association with, and/or etc., with an account on the DLN. For instance, an "audit" of a participant on the DLN may include a review of the participant's credentials that the participant has access to, ownership of, association with, and/or etc., an account on the DLN. An audit or review of accounts on the DLN may include, for example, review of most or all information related to the accounts, including but not limited to contents of the accounts (e.g., assets such as but not limited to tokens contained therein), current and/or previous ownerships of the accounts, records related to the accounts, and/or the like. An audit or review of smart contracts may include the review of the behavior of smart contracts during the execution of transactions. For example, an audit of a smart contract may include the execution of test transactions using smart contracts as discussed below in more details. The term "auditor" may refer to the entity (e.g., person(s), companies, and/or etc.) performing the audit process as discussed above. In some implementations, an auditor may include entities that perform traditional auditing processes. In some implementations, an auditor may include entities that do not perform traditional auditing processes but may be provided access to review actions and/or accounts on the DLN, non-limiting examples of which include regulators, reviewers, observers, security specialists testing the integrity and security of the DLN (including smart contracts, for example), entities or persons performing so-called "penetration tests (pen-tests)" on the DLN, etc. In some embodiments, the auditor may also be a participant of the DLN. The term "auditee" may refer to the entity (e.g., person(s), companies, and/or etc.) on the DLN that are involved in the transactions that are being audited, whose access to, ownership of, association with, and/or etc., to an account is being audited, and/or etc. In some cases, the auditee may also be a participant of the DLN.

FIG. 1 shows a DLN configured for use in managing and representing a private transaction between two parties that are participants of the network, in particular a public network, according to an embodiment. As shown in FIG. 1, the DLN or blockchain network 100 includes multiple computing nodes 102a-102e configured to communicate amongst each other via a peer-to-peer (P2P) connection. In some implementations, the computing nodes 102a-102e can each be computing devices including but not limited to a computer, server, processor, data/information processing machine or system, and/or the like, and include a data storage system such as a database, memory (volatile and/or non-volatile), etc. In some implementations, the P2P connections may be provided by wired and/or wireless communications systems or networks (not shown) such as but not limited to the internet, intranet, local area networks (LANs), wide area networks (WANs), etc., using wireless communication protocols or standards such as WiFi®, LTE®, WiMAX®, and/or the like.

In some embodiments, the DLN 100 may include self-executing codes or smart contracts that are configured to execute upon fulfillment of conditions that are agreed upon between transacting parties. For example, some or all of the computing nodes 102a-102e may include copies of a self-executing code that self-execute upon fulfillment of the conditions. In some implementations, the computing nodes 102a-102e may communicate amongst each other with the results of the executions of their respective self-executing codes, for example, to arrive at a consensus on the results. In some implementations, one or a few of the computing nodes 102a-102e may have self-executing codes that self-execute, and the results can be transmitted to the rest of the computing nodes 102a-102e for confirmation.

In some embodiments, a self-executing code or a smart contract can facilitate the completion of transactions on the DLN 100 by providing the transacting parties confidence that the other party would deliver the promised product or payment. For example, with reference to the above example related to the sale of a digital music file, a smart contract can be used to verify that the seller of the file is in fact an owner of the file, the buyer of the music file has adequate resources to pay for the music file, etc. Further, the smart contract can facilitate the exchange of the music file by allowing the transfer of a payment to occur only after the transfer of the music file is completed (and validated). In some embodiments, the self-executing code or smart contract may also include rules that apply to the accounts involved in the transactions and interfere with the completion of the transactions. For example, with respect to the example of the digital music file above, the smart contract may include a rule restricting the supposed music buyer from transferring payment (e.g., tokens) for a period of time (e.g., until an investigation determines that none of the tokens are stolen, until the buyer reaches the age when she or he is allowed to access the music, etc.).

In some embodiments, the DLN 100 may be linked to one or more compute device(s) such as oracles (not shown) or data feeds that provide external data to the DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on the price of a stock, a weather condition, etc., and an oracle may provide the requisite information to the smart contract facilitating the transaction. The smart contract, upon receiving the information, may self-execute after determining that the condition for the transaction has been fulfilled. In some embodiments, the oracles may gather information related to the smart contract and/or the DLN 100 (e.g., for use by external systems). For example, the oracle may query the state of the smart contract periodically and register any changes (which may be accessed later by the external systems). As another example, an execution of the smart contract may cause changes to the DLN 100 or parts thereof (e.g., to a storage system of the DLN 100) and the oracle may query for and register these changes, again for later access by the external systems.

In some embodiments, at least a substantial number of the computing nodes 102a-102e (e.g., at least greater than 50%, 60%, 75%, 90%, including values and subranges therebetween, of the total number of computing nodes 102a-102e that make up the DLN 100) include copies of a distributed ledger 104a-104e onto which transactions that occur on the network are recorded. The recording of the transactions on the distributed ledger 104a-104e may occur when some substantial number of the computing nodes 102a-102e, or a subset thereof, agree on the validity of the transactions. The distributed ledger 104a-104e can be immutable or nearly immutable in the sense that to alter the distributed ledger 104a-104e, at least this substantial number of the computing nodes 102a-102e would have to agree, which can be increasingly difficult when the number of computing nodes 102a-102e is large (and the distributed ledger 104a-104e gets longer).

Figure 2:
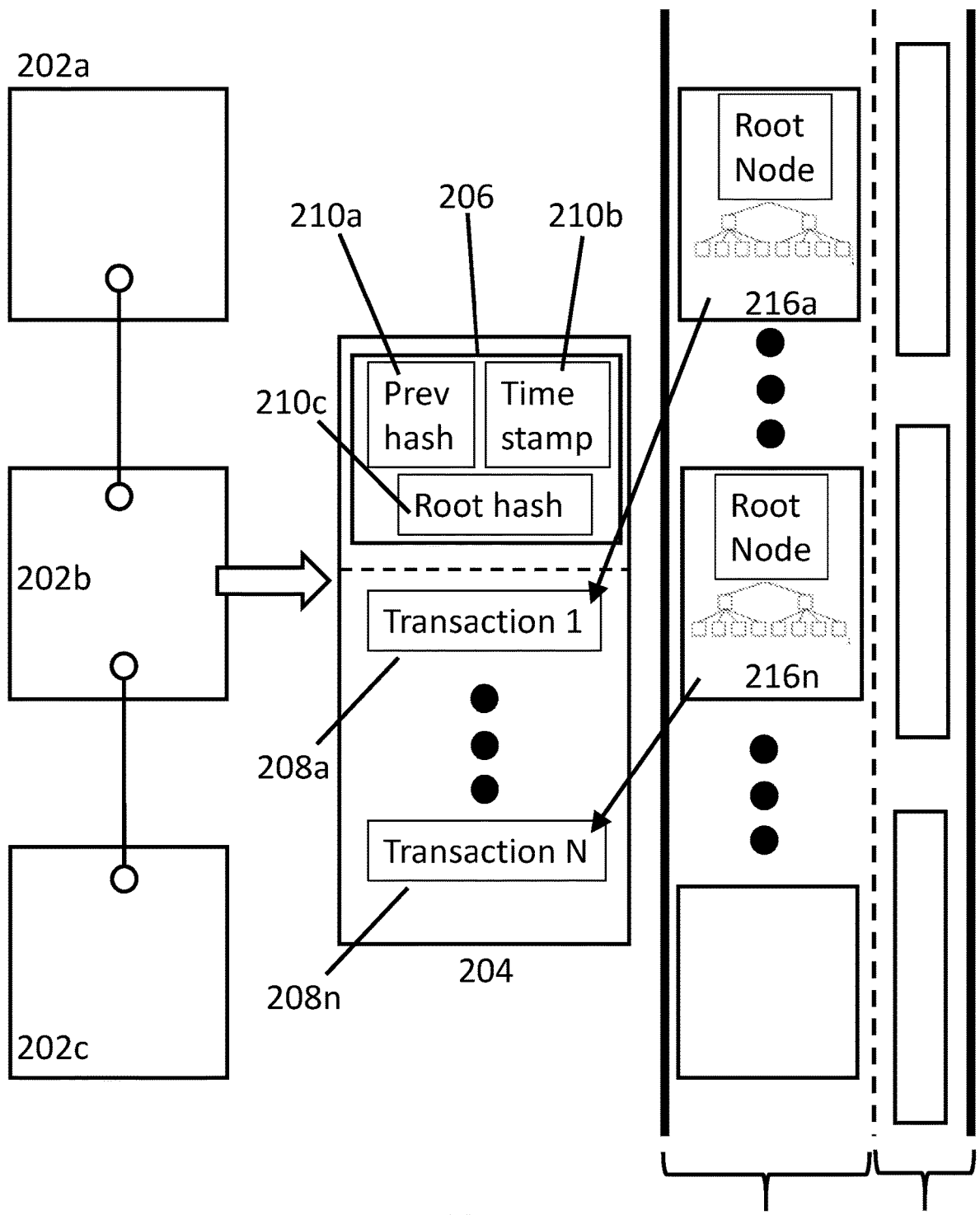
FIG. 2 shows a schematic of the storing of DLN state data and the recording of said data on the distributed ledgers of the networks, according to some embodiments.

FIG. 2 shows a schematic of the storing of distributed ledger-based networks state data and the recording of said data on the distributed ledgers of the networks, according to some embodiments. In some embodiments, transactions that occur or are represented on the DLN 100 (with the use of tokens, for example) are recorded onto at least a substantial number (e.g., a majority, at least 60%, at least 75%, etc.) of the distributed ledgers 202a-202c that exist on the DLN 100. For example, a transaction between DLN participants representing the transfer of an off-chain asset from one participant to another would be recorded on all or nearly all of the distributed ledgers 202a-202c once the transaction details are accepted as valid by the participants of the DLN 100. In such implementations, the off-chain asset may be represented on the DLN 100 with a non-fungible token. Similarly, a transfer of a payment (e.g., in the form of a fungible token such as but not limited to a crypto-currency) for the off-chain asset would be recorded on all or nearly all of the distributed ledgers 202a-202c once the payment is accepted as valid.

In some embodiments, the distributed ledgers 202a-202c of a DLN 100 can include multiple hash-linked individual blocks (e.g., 202a, 202b, 202c) where the hash of data contained within the genesis block 202a (e.g., the initial block formed at the start of the DLN 100) is included in the child block 202b, the hash of the child block 202b is included in the grandchild block 202c, and so on. In some implementations, the afore-mentioned immutability or near immutability of the distributed ledgers 202a-202c of a DLN 100 at least partly derives from the fact that the distributed ledgers 202a-202c comprise hash-linked blocks, since an attempt by a participant of the DLN 100 to change data at, for example, the genesis block 202a (for example, to steal tokens by transferring them from someone's account to his or her own) would change the hash of the genesis block 202a included in the child block 202b, which in turn would change the hash of the child block 202*b* included in the grandchild block 202*c*, etc. In some implementations, these changes would not be recorded on the distributed ledgers 202*a*-202*c* of the DLN 100, as to do so would require consensus by at least a significant number of the users of the computing nodes that constitute the DLN 100, as discussed above.

In some embodiments, an example block 204 of the distributed ledgers 202*a*-202*c* can include a block header 206 and a list of transaction identifiers 208*a*-208*n* identifying the transactions that are recorded on the block 204. In some implementations, the block header 206 includes, amongst other things, a reference (e.g., hash of) the previous block 210*a* linking the current block to all preceding blocks, a timestamp 210*b*, a root hash 210*c*, and/or etc. In some implementations, the state data, i.e., the data that includes information related to the transactions recorded on the block 204 (and identified by the list of transaction identifiers 208*a*-208*n*) may be stored in a state data storage 212. For example, data related to transactions identified by transaction identifiers 208*a*-208*n* may be stored in the state data storage 212 in the form of tree structures 216*a*-216*n* (e.g., the data may be stored as leaf nodes of the tree structures 216*a*-216*n*). In some embodiments, the root nodes of the tree structures 216*a*-216*n* may also be included in the block header 206, e.g., in the root hash 210*c*. In some implementations, the state data may be stored on the DLN 100, i.e., the state data storage 212 storing the state data may be the storage system of the DLN 100 (e.g., the storage systems of the computing nodes 102*a*-102*e* that constitute the DLN 100). In some implementations, the state data storage 212 may not be on the DLN 100, i.e., the state data may be stored off-chain. In either case, in some implementations, the state data storage 212 may be operationally linked or coupled to the DLN 100 via, among other things, the inclusion of the hash of root nodes of the tree structures 216*a*-216*n* that store the state data.

Examples of the information contained within the state data include the status of accounts, and changes thereof, of accounts of the DLN 100, such as but not limited to, changes or state transitions of account balances as payments made from one account to another. For instance, the state data may include information related to the amount of assets or tokens in the accounts of a token transferor (e.g., buyer of a product or service) and a token recipient (e.g., seller of the product or service) prior to, and/or subsequent to, the transfer of tokens as an agreed-upon payment.

In some embodiments, a smart contract may be used to manage the above-mentioned changes or state transitions in the state data that occur as results of transactions conducted on the DLN 100 and recorded in the list of transaction identifiers 208*a*-208*n* of the block 204 of the distributed ledgers 202*a*-202*c*. For example, two participants of the DLN 100 may be engaged in a transaction and may use the smart contract of the DLN 100 to regulate the transfer of tokens from the first participant to the second participant during the transaction. For instance, the smart contract may be configured to transfer a predetermined number of tokens from a first account of the first participant to a second account of the second participant once a certain condition is fulfilled (e.g., when the smart contract receives a confirmation that the first participant has received a product or a service from the second participant). In such implementations, when receiving an indication that the condition is fulfilled, the smart contract may be activated to write into the state data changes or state transitions such as, but not limited to, reduction in the token balance of the first account by the predetermined number of tokens and a concomitant increase in the token balance of the second account by the same or less number of tokens (e.g., less in cases where there are transaction fees). In some implementations, such a transaction may be listed on a block of the distributed ledgers of the DLN 100 (e.g., using a transaction identifier of the multiple transaction identifiers 208*a*-208*n* of the block 204 of the distributed ledgers 202*a*-202*c*) and the transaction data may be stored in a tree structure of the multiple tree structures 216*a*-216*n* of the state data storage 212. In some implementations, a hash of a root node of the tree structure having the transaction data may be included in the root hash 210*c* of the block header 206 of the block 204.

In some embodiments, there may be a desire to interact with the smart contract of the DLN 100 without the resulting state data changes being made to the state data (e.g., stored in the state data storage 212). For example, as discussed above, an auditor may be interested in analyzing the behavior of the smart contract and may activate or trigger the smart contract as a test, while wishing to avoid the resulting state data changes from being included in the state data. As an example non-limiting illustration, an auditor may be tasked to review or audit the accounts and transactions of a DLN 100 participant ("auditee"). As discussed above, smart contracts may include rules that apply to the accounts, tokens contained within accounts and/or transactions involving the accounts, and as a result may effectively limit the account rights of the account owners. For instance, if the account owner or auditee claims to have a given number of tokens in an account (and even be able to demonstrate that the account carries the claimed number of tokens), the auditor may still wish to determine if there are any restrictions placed on the account and/or the tokens due to smart contract rules (e.g., an active transferDisable mode that may be applicable to the account and/or the tokens because the tokens were stolen, etc.). In such implementations, the auditor may wish to determine if the smart contract can be activated or triggered to transfer the tokens from the account of the auditee to another account without any limitations or restrictions. As discussed above, the auditor may want to make the determination without having to actually transfer the tokens from the auditee's account, that is, without having to make the state data changes to the state data of the DLN 100 or without having to store the state data changes in the state data storage 212. Example reasons for wishing to avoid making the state data changes in the state data storage 212 include the desire to avoid transaction fees and/or difficulties that arise when there are, in particular, a large number of accounts to audit such as but not limited to high memory requirements, computer and network performance degradations, and/or etc. Further, the auditor may want to make the determination without having to fork the DLN 100, at least for the reason that doing so would involve significant computational resources (e.g., storage, bandwidth, etc.) since the auditor may have to fork or copy the DLN 100 for each audit (i.e., transaction test) the auditor performs.

In some embodiments, a state data storage overlay 214 that is linked or coupled to the state data storage 212 may be used to store state data changes that result when a smart contract is activated or triggered to execute a transaction (e.g., by an auditor testing the smart contract with a test transaction) such that the state data changes are not stored in the state data storage 212. As such, in some implementations, the state data changes may not occur in the DLN 100. In some implementations, a state data storage module (not shown) may be used to bypass the storing of the state data changes in the state data storage 212, and instead have the data changes be stored in the state data storage overlay 214 when the transaction is not desired to be included in the list of transactions 208a-208n of a block 204. In some implementations, the state data storage overlay 214 may not be hash linked to the block 204. That is, the root hash 210c that contains the hash of a root node of a tree structure including state data stored in the state data storage 212 may not include any reference (e.g., a hash of the root node of) a tree structure that stores the state data changes in the state data storage overlay 214.

In some embodiments, when executing a transaction (e.g., a test transaction by an auditor testing a smart contract on a DLN 100), one way to avoid storing the resulting state data changes in the state data storage 212 is by modifying "write" data and/or "read" data operations that are part of the execution of the transaction. In some implementations, at the start of the execution of the transaction, the state data storage overlay 214 may not contain any data, and the state data storage 212 may contain data related to all transaction that have occurred on the DLN since the inception of the DLN. In such implementations, i.e., when the state data storage overlay 214 contains no data, the state data storage module may not allow a "read data" operation that is directed at the state data storage overlay 214 to execute without modification. For example, the state data storage module may modify any "read data" operation that is directed at the state data storage overlay 214 (i.e., a "read data" operation that attempts to call data from the state data storage overlay 214 as an input) to instead "read data" from the state data storage 212. Once data is written or stored into the state data storage overlay 214, however, in some implementations, the state data storage module may allow a "read data" operation that is directed at the state data storage overlay 214 to execute without modification, i.e., read data from the state data storage overlay 214 (e.g., provided the data to be read, i.e., the input data, is available in the state data storage overlay 214).

In some embodiments, the state data storage module may not allow any "write data" operation directed at the state data storage 212 to execute without modification. For example, the state data storage module may modify any "write data" operation that is directed at the state data storage 212 (i.e., a "write data" operation that attempts to write or store data in the state data storage 212 as an output) to instead "write data" or store data at the state data storage overlay 214. In some implementations, the data written to or stored at the state data storage overlay 214 includes data changes with respect to data that is already stored at the state data storage 212. For example, if the transaction involved the transfer of tokens from one account on the DLN 100 to another account, the data that is written to or stored at the state data storage overlay 214 include changes in the state data 212 that would have occurred (e.g., changes in account balances) if all the transaction data was stored in the state data 212. In other words, the data that is written to or stored at the state data storage overlay 214 includes data changes with respect to the state data 212 (that remains unchanged after the transaction). In such implementations, the storage or memory requirement for performing transactions (e.g., test transactions such as smart contract auditing transactions) are significantly reduced compared to, for example, forking an entire DLN 100 since only the changes with respect to the main state data storage 212 are stored in the state data storage overlay 214. This is in particular the case when performing a large number of transactions, since state data changes due to each transaction can be saved in a state data storage overlay 214 with respect to the same data storage (i.e., the DLN 100 may not be forked as many number of times as there are transactions). In some implementations, the state data storage overlay 214 may be a local storage (e.g., off-chain storage).

In some embodiments, as an example illustration, an auditor may couple the state data storage module to the DLN 100 (e.g., at a computing node of the plurality of computing nodes 102a-102e that constitute the DLN 100) when requested to perform an audit of an account and/or an analysis of the smart contract of the DLN 100. In some embodiments, the state data storage module may be configured to bypass the storing of any data changes generated as a result of the activation of the smart contract by the auditor to execute a transaction (e.g., test transaction) that is not intended to be recorded on the distributed ledgers 202a-202c of the DLN 100. For example, the test transaction may include an instruction to the smart contract to transfer a set number of tokens from the account being audited to a different account. When receiving the instruction, in some implementations, the smart contract may be activated and initiate the process of transferring the tokens according to any smart contract rules that may be applicable to the account and/or transactions involving the account. In such implementations, the state data storage module may prevent the transaction data generated as a result, which may include state data changes such as but not limited to decreases in account balances of the account being audited, increases in account balances of the account to which the tokens are transferred, etc., from being stored in the state data storage 212. Instead, the state data storage module may facilitate the storing of the state data changes in the state data storage overlay 214. Further, the test transaction may not be recorded on the distributed ledgers 202a-202c of the DLN 100. As such, any changes due to the test transaction may not be reflected in the state data storage 212 or the DLN 100, but rather may be isolated into the state data storage overlay 214, which the auditor can then analyze as part of the audit of the account and/or the smart contract. In such embodiments, no changes in account balances may occur in the DLN 100, since the state data changes are not stored in the state data storage 212. In some embodiments, instead of or in addition to coupling the state data storage module to the DLN 100, the auditor may also obtain a copy of the DLN 100 (e.g., by forking the DLN 100) and perform the audit with the forked DLN 100.

An example pseudo-code executed by the state data storage module when modifying "read data" and/or "write data" operations as discussed above may read as follows:

```
Class StateDataStorageModule {
    function write(key, value) {
    // write data requests are directed to write data the state data storage
overlay 214 (e.g., a local storage)
        Overlay Storage[key]=value
    }
    function read(key) {
        if(OverlayStorage[key]) {
```

```
        // If data to be read by a "read data" operation is available
in the state data storage overlay 214 then the data is returned from the state data
storage overlay 214
            return OverlayStorage[key]
        }
        else {
        // If the data is not available in the state data storage overlay
214 then return it from the main state data storage 212
            return dataStorage[key]
        }
    }
  }
}
```

In some embodiments, the systems, apparatus and methods disclosed herein allow an auditor to interact with a smart contract of a DLN without the need to fork the DLN. This capability is in particular highly useful when one interacts with the smart contract a significant number of times (e.g., when having to audit a large number of accounts or transactions on a DLN) because, among other reasons, forking the DLN for each account to be audited would involve a significant amount of resources (e.g., storage, bandwidth, etc.). In comparison, the resources that may be used for the state data storage overlay 214 can be much lower.

Figure 3:
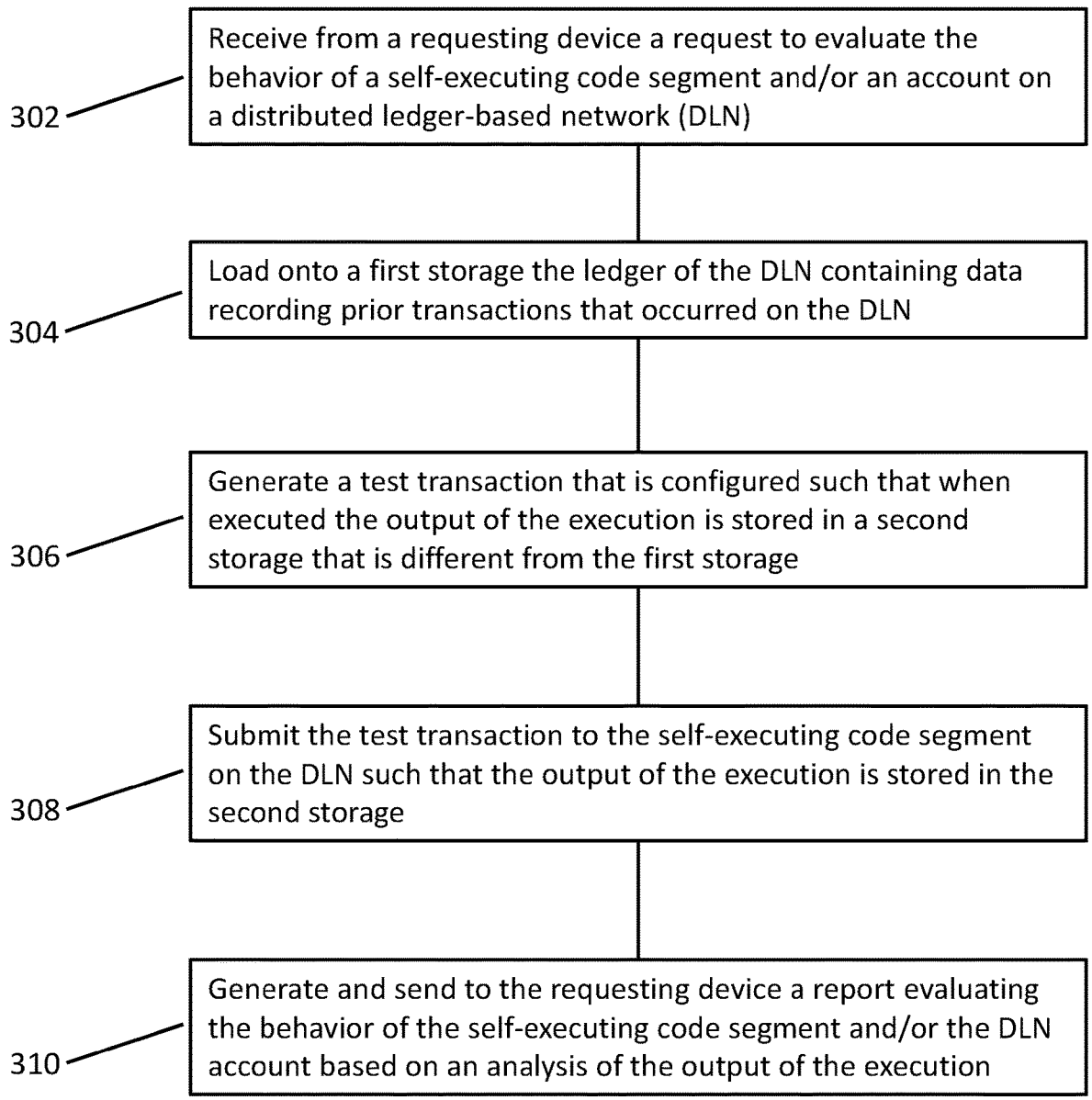
FIG. 3 shows a flowchart illustrating the determination of the behavior of a self-executing code segment and/or an account on a DLN without forking the DLN, according to some embodiments.

FIG. 3 shows a flowchart illustrating the determination of the behavior of a self-executing code segment and/or an account on a DLN without forking the DLN, according to some embodiments. At 302, a request to evaluate the behavior of a self-executing code segment (e.g., smart contract) on the DLN and/or an account on the DLN is received. The behavior of the self-executing code segment can be the behavior of the self-executing code segment as it relates to executions of transactions on the DLN. For example, the behavior can include rules that the self-executing code segment applies to, or enforces on, transactions (and related DLN accounts) executed by the self-executing code segment. For instance, the rules may be limitations or restrictions on the accounts such as, but not limited to, a limitation or restriction on the transfer of tokens to and/or from the accounts. The request may be received at a computing device of an auditor that is tasked with determining the existence and nature of any restrictions placed on the account by the self-executing code segment. The request may be sent by a requesting device of an entity that may have an interest in finding out about the restrictions (e.g., financial institutions transacting with an owner of the account and wishing to ascertain if there are any restrictions placed on the account). At 304, the data including from the distributed ledgers of the DLN is loaded onto a first storage system. Such a storage system may be, for example, the storage system associated with the computing device of the auditor. The data may include data stored on the distributed ledgers since the inception of the DLN. At 306, the computing device (of the auditor, for example) generates a test transaction that is configured such that when the test transaction is executed, outputs of the execution are stored in a second storage that is different from the first storage. In some implementations, the outputs of the execution of the test transaction may not be stored in the first storage. At 308, the test transaction is submitted to the self-executing code segment of the DLN, and outputs of the execution are stored at the second storage that is different from the first storage. That is, outputs of the execution of the test transaction are stored in a storage that is different from the storage onto which the data from the distributed ledgers of the DLN is loaded. At 310, the auditor analyzes, via the computing device, the outputs of the execution and determine, for example, the above-noted restrictions placed on the account by the self-executing code segment. In some implementations, the auditor, via the computing device, generates and sends a report about the restrictions to the requesting device of the entity that sent the request.

Figure 4:
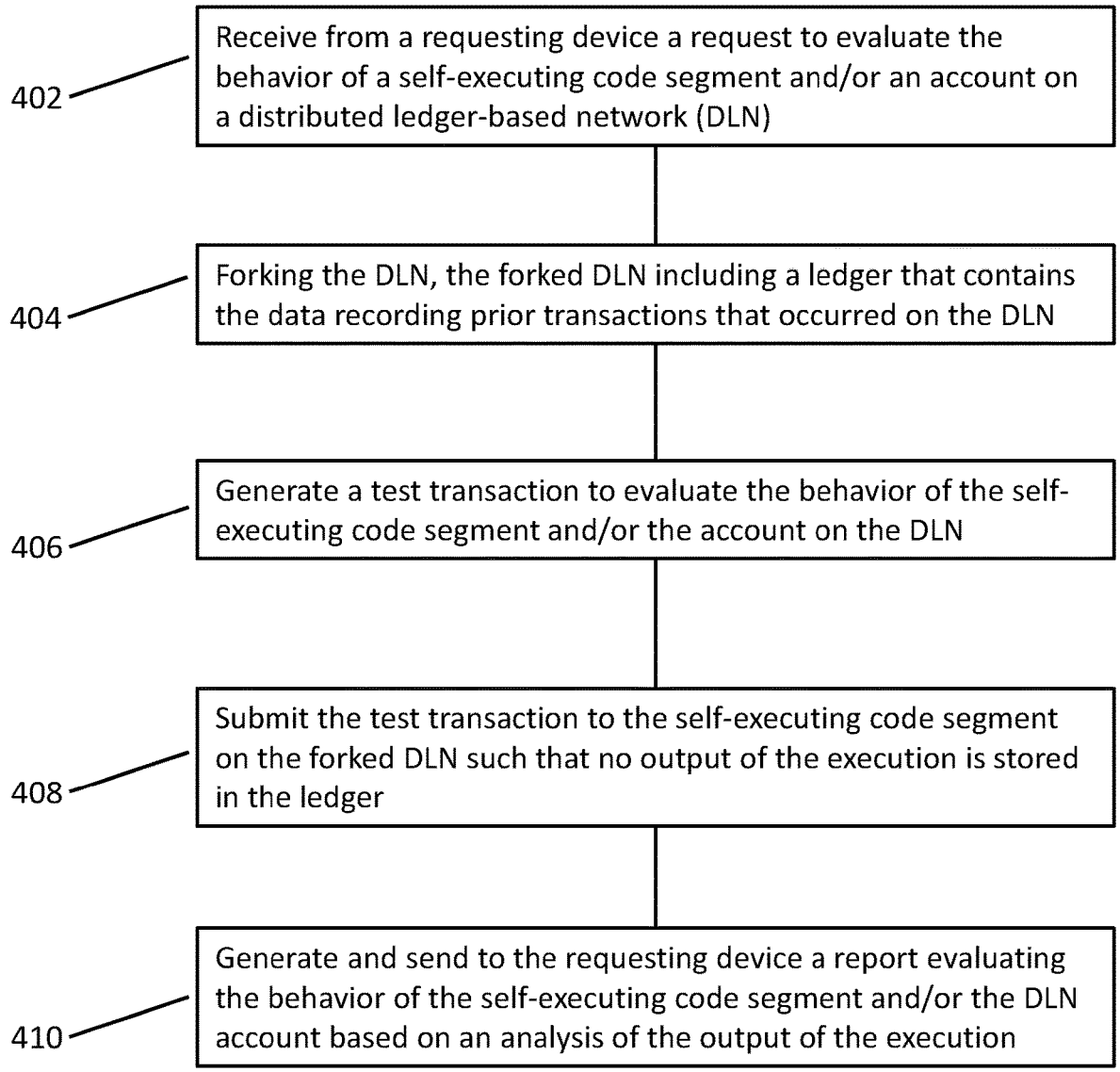
FIG. 4 shows a flowchart illustrating the determination of the behavior of a self-executing code segment and/or an account on a DLN using a forked DLN, according to some embodiments.

FIG. 4 shows a flowchart illustrating the determination of the behavior of a self-executing code segment and/or an account on a DLN using a forked DLN, according to some embodiments. At 402, a request to evaluate the behavior of a self-executing code segment (e.g., smart contract) on the DLN and/or an account on the DLN is received. For example, the request may be received at a computing device of an auditor that is tasked with determining the existence and nature of any restrictions placed on the account by the self-executing code segment. The request may be sent by a requesting device of an entity that may have an interest in finding out about the restrictions (e.g., financial institutions transacting with an owner of the account and wishing to ascertain if there are any restrictions placed on the account). At 404, the DLN is forked to form a forked DLN. That is, the forked DLN may include copies of the distributed ledgers of the DLN that contain data related to transactions that have occurred on the DLN (e.g., transactions that have occurred prior to the forking of the DLN). The forked DLN may also include a copy of a self-executing code segment (e.g., smart contract) that was present on the DLN prior to forking. At 406, a computing device (of the auditor, for example) generates a test transaction that is configured such that when the test transaction is executed, outputs of the execution are not recorded on distributed ledgers of the forked DLN. For example, outputs of the execution may be stored in a storage that is different from the storage used to store the distributed ledgers of the forked DLN. At 408, the test transaction is submitted to the self-executing code segment of the forked DLN, and outputs of the execution are stored at a storage that is different from the storage of the distributed ledgers of the forked DLN. At 310, the auditor analyzes, via its computing device, the outputs of the execution and determines, for example, the above-noted restrictions placed on the account by the self-executing code segment. In some implementations, the auditor, via its computing device, may generate and send a report about the restrictions to the requesting device of the entity that sent the request.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e. , to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
    receiving, at a computing node of a distributed ledger-based network (DLN), a request to evaluate an account on the DLN and/or a behavior of a self-executing code segment of the DLN;
    forking the DLN to form a forked DLN that includes a ledger onto which are recorded prior transactions executed on the DLN;
    generating, at the computing node and in response to the request, a test transaction to evaluate the behavior of the self-executing code segment and/or the account;
    submitting, via the computing node, the test transaction to the self-executing code segment on the forked DLN for execution, the test transaction configured such that no output of the execution of the test transaction is recorded on the ledger; and
    analyzing an output of the execution to generate a report evaluating the account and/or the behavior of the self-executing code segment.

2. The method of claim 1, wherein the request includes a plurality of requests, and the forking the DLN occurs fewer times than a number of requests in the plurality of requests.

3. The method of claim 1, wherein the test transaction is further configured such that an output of the execution of the test transaction is stored in a storage of the computing node that does not include the ledger.

4. The method of claim 1, wherein the forked DLN includes the self-executing code segment.

5. The method of claim 1, wherein the report indicates at least one restriction placed on the account on the DLN by the self-executing code segment.

6. The method of claim 1, wherein the request is received from a requesting compute device, the method further comprising:
    sending the report to the requesting compute device.

7. A processor-readable non-transitory medium storing instructions, that when executed by a processor, cause the processor to:
    receive, at a computing node of a distributed ledger-based network (DLN), a request to evaluate an account on the DLN and/or a behavior of a self-executing code segment of the DLN;
    fork the DLN to form a forked DLN that includes a ledger onto which are recorded prior transactions executed on the DLN;
    generate, at the computing node and in response to the request, a test transaction to evaluate the behavior of the self-executing code segment and/or the account;
    submit, via the computing node, the test transaction to the self-executing code segment on the forked DLN for execution, the test transaction configured such that no output of the execution of the test transaction is recorded on the ledger; and
    analyze an output of the execution to generate a report evaluating the account and/or the behavior of the self-executing code segment.

8. The medium of claim 7, wherein the request includes a plurality of requests, and the forking the DLN occurs fewer times than a number of requests in the plurality of requests.

9. The medium of claim 7, wherein the test transaction is further configured such that an output of the execution of the test transaction is stored in a storage of the computing node that does not include the ledger.

10. The medium of claim 7, wherein the forked DLN includes the self-executing code segment.

11. The medium of claim 7, wherein the report indicates at least one restriction placed on the account on the DLN by the self-executing code segment.

12. The medium of claim 7, wherein the request is received from a requesting compute device, the method further comprising:
    sending the report to the requesting compute device.

13. An apparatus, comprising:
    a processor; and
    a memory coupled to the processor, the memory storing instructions, that when executed by the processor, cause the processor:

receive, at a computing node of a distributed ledger-based network (DLN), a request to evaluate an account on the DLN and/or a behavior of a self-executing code segment of the DLN;

fork the DLN to form a forked DLN that includes a ledger onto which are recorded prior transactions executed on the DLN;

generate, at the computing node and in response to the request, a test transaction to evaluate the behavior of the self-executing code segment and/or the account;

submit, via the computing node, the test transaction to the self-executing code segment on the forked DLN for execution, the test transaction configured such that no output of the execution of the test transaction is recorded on the ledger; and analyze an output of the execution to generate a report evaluating the account and/or the behavior of the self-executing code segment.

14. The apparatus of claim 13, wherein the request includes a plurality of requests, and the forking the DLN occurs fewer times than a number of requests in the plurality of requests.

15. The apparatus of claim 13, wherein the test transaction is further configured such that an output of the execution of the test transaction is stored in a storage of the computing node that does not include the ledger.

16. The apparatus of claim 13, wherein the forked DLN includes the self-executing code segment.

17. The apparatus of claim 13, wherein the report indicates at least one restriction placed on the account on the DLN by the self-executing code segment.

* * * * *